(12) United States Patent
Salvekar et al.

(10) Patent No.: US 8,890,722 B2
(45) Date of Patent: Nov. 18, 2014

(54) METHOD AND APPARATUS FOR SOFT SYMBOL DETERMINATION

(75) Inventors: Atul A. Salvekar, Emeryville, CA (US);
Young Geun Cho, Palo Alto, CA (US);
Jia Tang, Campbell, CA (US);
Shantanu Khare, Chicago, IL (US);
Ming-Chieh Kuo, San Diego, CA (US);
Iwen Yao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 360 days.

(21) Appl. No.: 13/493,942

(22) Filed: Jun. 11, 2012

(65) Prior Publication Data
US 2012/0249346 A1 Oct. 4, 2012

Related U.S. Application Data

(63) Continuation of application No. 12/763,709, filed on Apr. 20, 2010, now Pat. No. 8,199,034.

(51) Int. Cl.
*H03M 7/00* (2006.01)
*H04L 1/00* (2006.01)
*H04L 27/34* (2006.01)

(52) U.S. Cl.
CPC .............. *H04L 1/005* (2013.01); *H04L 1/0055* (2013.01); *H04L 27/34* (2013.01); *H04L 1/0052* (2013.01); *H04L 1/0067* (2013.01)
USPC .................. 341/50; 341/51; 341/94; 341/107

(58) Field of Classification Search
USPC ........................................ 341/50–51, 94, 107
See application file for complete search history.

(56) References Cited

U.S. PATENT DOCUMENTS

| | | | | |
|---|---|---|---|---|
| 6,014,411 | A | * | 1/2000 | Wang .............................. 375/259 |
| 6,166,667 | A | * | 12/2000 | Park .................................. 341/94 |
| 7,162,683 | B2 | | 1/2007 | Bune |
| 7,222,286 | B2 | | 5/2007 | Kim |
| 8,199,034 | B2 | | 6/2012 | Salvekar et al. |
| 8,325,863 | B2 | | 12/2012 | Stamoulis et al. |
| 2003/0066018 | A1 | | 4/2003 | Yu et al. |
| 2004/0258139 | A1 | | 12/2004 | Namgoong et al. |
| 2006/0188044 | A1 | | 8/2006 | Wang et al. |

(Continued)

FOREIGN PATENT DOCUMENTS

| | | |
|---|---|---|
| CN | 1406415 A | 3/2003 |
| CN | 1838582 A | 9/2006 |

(Continued)

OTHER PUBLICATIONS

Kim, Y., et al., "Hybrid MIMO Receiver Using QR-MLD and QR-MMSE," Global Telecommunications Conference, 2009. GLOBECOM 2009. IEEE, Dec. 4, 2009, pp. 1-5.

(Continued)

*Primary Examiner* — Khai M Nguyen
(74) *Attorney, Agent, or Firm* — Jeffrey D. Jacobs

(57) ABSTRACT

A method for wireless communication is disclosed that includes selecting a plurality of probabilities for a symbol based on a bit-to-symbol mapping; calculating a conditional mean of the symbol based on the plurality of probabilities; and, generating a signal representative of the symbol based on the conditional mean of the symbol. An apparatus for performing the method is also disclosed.

36 Claims, 15 Drawing Sheets

(56) References Cited

U.S. PATENT DOCUMENTS

| | | |
|---|---|---|
| 2007/0041475 A1 | 2/2007 | Koshy et al. |
| 2007/0118786 A1 | 5/2007 | Lim et al. |
| 2007/0140320 A1 | 6/2007 | Banna et al. |
| 2007/0201632 A1 | 8/2007 | Ionescu |
| 2007/0230609 A1 | 10/2007 | Hwang et al. |
| 2008/0069038 A1 | 3/2008 | Yamamoto et al. |
| 2008/0304589 A1 | 12/2008 | Tsuruta et al. |
| 2009/0031185 A1 | 1/2009 | Xhafa et al. |
| 2009/0052578 A1 | 2/2009 | Sawai |
| 2009/0067553 A1 | 3/2009 | McElwain |
| 2009/0154599 A1 | 6/2009 | Siti et al. |
| 2009/0254797 A1 | 10/2009 | Wu et al. |
| 2009/0287859 A1 | 11/2009 | Bond et al. |
| 2009/0296842 A1 | 12/2009 | Papadopoulos et al. |
| 2009/0300463 A1 | 12/2009 | Purkovic et al. |
| 2011/0007729 A1 | 1/2011 | Nogami et al. |
| 2011/0051831 A1 | 3/2011 | Subrahmanya et al. |
| 2011/0051858 A1 | 3/2011 | Salvekar et al. |
| 2011/0051860 A1 | 3/2011 | Tang et al. |

FOREIGN PATENT DOCUMENTS

| | | |
|---|---|---|
| CN | 201018490 Y | 2/2008 |
| CN | 101183919 A | 5/2008 |
| CN | 101321148 A | 12/2008 |
| CN | 101411086 A | 4/2009 |
| EP | 1217776 A2 | 6/2002 |
| EP | 1432129 A2 | 6/2004 |
| JP | 2000092025 A | 3/2000 |
| JP | 2003504938 A | 2/2003 |
| JP | 2006246341 A | 9/2006 |
| JP | 2008124843 A | 5/2008 |
| JP | 2008533912 A | 8/2008 |
| JP | 2009055228 A | 3/2009 |
| JP | 2009526486 A | 7/2009 |
| TW | I297244 B | 5/2008 |
| WO | 0105059 A1 | 1/2001 |
| WO | 0119013 A1 | 3/2001 |
| WO | 2006042326 | 4/2006 |
| WO | 2006099267 A2 | 9/2006 |
| WO | 2007000917 A1 | 1/2007 |
| WO | 2007095102 A1 | 8/2007 |
| WO | 2009104582 A1 | 8/2009 |

OTHER PUBLICATIONS

Miki N., et al., "Performance of Multipath Interference Canceller using Soft-Decision Replica Combined with Hybrid ARQ in High Speed Downlink Packet Access", RCS Technical Report of the Institute of Electronics, Information and Communication Engineers, Oct. 13, 2001, vol. 101, No. 371, pp. 99-104, RCS2001-165.

Yang, T., et al., "Jointly gaussian approximation and multi-stage LLR combining in the iterative receiver for MIMO-BICM systems," Wireless Communications, IEEE Transactions on, Dec. 2008, vol. 7, No. 12, pp. 5250-5256.

Yang, T., et al., "Successive LLR Combining in the Iterative Receiver for MIMO-BICM Systems," Global Telecommunications Conference, 2007. GLOBECOM '07. IEEE, Nov. 30, 2007, pp. 1775-1779.

Li Q., et al., "Improved Turbo Equalization Schemes Robust to SNR Estimation Errors,Achieving near-capacity on a multiple-antenna channel", Jun. 1, 2007,vol. E90-B, No. 6,pp. 1454-1459.

Gang Z. et al., "Strategy Design for LDPCC-HARG Using Segment Selective Repeat", Journal of Telemetry, Tracking, and Command, Sep. 15, 2008, vol. 29, No. 5, Abstract.

Hatakawa Y. et al., "Proposal of Twin Turbo MIMO-OFDM", Technical Report of the Institute of Electronics, Information and Communication Engineers, Mar. 9, 2007, vol. 106, No. 597, pp. 35-40, IT2006-91, Abstract.

Takahashi Y. et al., "A Study on Time Domain Block Equalizer on MIMO Frequency Selective Channels", Technical Report of the Institute of Electronics, Information and Communication Engineers, Feb. 22, 2008, vol. 107, No. 499, pp. 147-152, WBS2007-102, Abstract.

Uhlemann E. et al., "Hard decision packet combining methods for industrial wireless relay networks," Second International Conference on Communications and Electronics (ICCE), Jun. 4-6, 2008, pp. 104-108.

Bertrand M. Hochwald and Stephan Ten Brink: "Achieving Near-Capacity on aMultiple-Antenna Channel" IEEE Transactions on Communications, vol. 51, No. 3, Mar. 1, 2003, XP002603968.

Christophe Laot et al., "Turbo Equalization: Adaptive Equalization and Channel Decoding Jointly Optimized", IEEE Journal on Selected Areas in Communications, IEEE Service Center, Piscataway, US, vol. 19, No. 9, Sep. 1, 2001, XP011055452, ISSN: 0733-8716.

Duho Rhee et al., "Iterative Narrowband Jamming Rejection Technique for Coded OFDMA-CDM Systems", Military Communications Conference, 2009, MILCOM 2009, IEEE, IEEE, Piscataway, NJ, USA, Oct. 18, 2009, pp. 1-6, XP031609645, ISBN: 978-1-4244-5238-5.

International Search Report and Written Opinion—PCT/US2011/033199, ISA/EPO—Aug. 31, 2011.

Liu D N, et al., "Low complexity affine MMSE detector for iterative detection-decoding MIMO OFDM systems", IEEE Transactions on Communications, IEEE Service Center, Piscataway, NJ, US, vol. 56, No. 1, Jan. 1, 2008, pp. 150-158, XP011224730.

Ming Zhao, et al., "An Iterative Receiver with Channel Estimation for MIMO-OFDM Over a Time and Frequency Dispersive Fading Channel", Global Telecommunications Conference, 2007. GLOBECOM '07. IEEE, IEEE, Piscataway, NJ, USA, Nov. 1, 2007, pp. 4155-4159, XP031196718, DOI: DOI:10.1109/ GLOCOM.2007.585 ISBN: 978-1-4244-1042-2.

Siti et al., "A Novel Soft-Output Layered Orthogonal Lattice Detector for Multiple Antenna Communications," IEEE ICC 2006 proceedings, pp. 1686-1691.

Siti, et al., "Layered Orthogonal Lattice Detector for Two Transmit Antenna Communications," in Allerton Conference on Communication, Control and Computing, Sep. 2005, pp. 1-10.

Tomasoni, Alessandro et al.: "Turbo-LORD: Map-Approaching Soft-Input Soft-Output Detector for Iterative MIMO Receivers" IEEE GLOBECOM 2007 Proceedings, Global Telecommunications Conference. Piscataway, NJ, USA, (Nov. 1, 2007), pp. 3504-3508, XP031196593, ISBN: 978-1-4244-1042-2.

Tomasoni, et. al., "A low complexity turbo MMSE Receiver for W-LAN MIMO Systems," Proceedings of IEEE ICC 2006 [9], pp. 4119-4124.

Uhlemann E, et al., "Packet combining and doping in concatenated hybrid ARQ schemes using iterative decoding", Wireless Communications and Networking, 2003. WCNC 2003. 2003 IEEE Mar. 16-20, 2003, Piscataway, NJ, USA,IEEE LNKD-DOI: 10.1109/WCNC.2003.1200482, vol. 2, Mar. 16, 2003, pp. 849-854, XP010639878.

Wooram Shin, et al., "Iterative LMMSE Channel Estimation, Detection, and Decoding with A Priori Information for ST-BICM Systems over Block Fading Channels", 2009 IEEE 69th Vehicular Technology Conference; April 26-29, 2009, Barcelona, Spain, IEEE, Piscataway, NJ, USA, Apr. 26, 2009, pp. 1-6, XP031474572.

Yang Gao, et al., "A Novel HARQ Scheme Utilizing the Iterative Soft-information Feedback in MIMO System"I E E E V T S Vehicular Technology Conference. Proceedings, IEEE, US, Apr. 1, 2007, pp. 423-424, XP031092664.

Yeong-Luh Ueng, et al., "Turbo coded multiple-antenna systems for near-capacity performance" IEEE Journal on Selected Areas in Communications, IEEE Service Center, Piscataway US vol. 27, No. 6' Aug. 1, 2009, pp. 954-964, XP011264538 ISSN: 0733-8716.

\* cited by examiner

METHOD AND APPARATUS FOR SOFT SYMBOL DETERMINATION

CROSS-REFERENCE TO RELATED APPLICATIONS

This application is a continuation of U.S. patent application Ser. No. 12/763,709, which was filed 20 Apr. 2010, and is incorporated herein by reference for all purposes.

BACKGROUND

I. Field

The following description relates generally to communication systems, and more particularly to a method and apparatus for soft symbol determination.

II. Background

In wireless communication systems, symbols are communicated between wireless devices to maximize information transmission. As part of the error detection and correction process for symbol transmission, a cyclic redundancy check (CRC) process is used to detect accidental changes to raw data. In the CRC process, a short, fixed-length binary sequence is calculated. This sequence is known as the CRC code or simply CRC. When a block is read or received the device repeats the calculation; if the new CRC does not match the one calculated earlier, then the block contains a data error and the device may take corrective action such as rereading or requesting the block be sent again. Interference cancellation may be then used to remove interference when the CRC passes.

In practice, CRC does not pass 10-30% of the time. In these cases, it is still desirable to use the information to remove interference. One approach involves using iterative and soft-interference schemes, which can provide 1-2+ dB gain depending on the scenario. In order to do iterative decoding of any type, a posteriori probabilities of the symbols after processing (e.g., turbo decoding) must be computed. In these schemes, the probability of the bits is an important quantity. In particular, the availability of the probability of the bits following a decoding or equalization event is desirable. Traditional data sequences are punctured and thus, some mechanism must be used to calculate these parity bit log-likelihood ratios (LLR) and also convert this information into symbol probabilities. Typically, a soft symbol re-encoder may be used. However, this element typically requires a design with some complexity.

Additional complexities are introduced when these decoding systems need to be applied to more sophisticated wireless communication schemes. For example, in order to address the issue of increasing bandwidth requirements that are demanded for wireless communications systems, different schemes are being developed to allow multiple user terminals to communicate with a single access point by sharing the channel resources while achieving high data throughputs. Multiple Input or Multiple Output (MIMO) technology represents one such approach that has recently emerged as a popular technique for the next generation communication systems. MIMO technology has been adopted in several emerging wireless communications standards such as the Institute of Electrical Engineers (IEEE) 802.11 standard. IEEE 802.11 denotes a set of Wireless Local Area Network (WLAN) air interface standards developed by the IEEE 802.11 committee for short-range communications (e.g., tens of meters to a few hundred meters).

Consequently, it would be desirable to address some of the issues noted above.

SUMMARY

The following presents a simplified summary of one or more aspects of a method and apparatus for method and apparatus for soft symbol determination in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to various aspects, the subject innovation relates to apparatus and methods that provide wireless communications, where a method for wireless communications includes selecting a plurality of probabilities for a symbol based on a bit-to-symbol mapping; calculating a conditional mean of the symbol based on the plurality of probabilities; and, generating a signal representative of the symbol based on the conditional mean of the symbol.

In another aspect, an apparatus for wireless communications is provided that includes an apparatus for wireless communication that includes means for selecting a plurality of probabilities for a symbol based on a bit-to-symbol mapping; means for calculating a conditional mean of the symbol based on the plurality of probabilities; and, means for generating a signal representative of the symbol based on the conditional mean of the symbol.

In yet another aspect, an apparatus for wireless communications is provided that includes a memory comprising a plurality of instructions; a processor coupled to the memory and configured to execute the plurality of instructions to select a plurality of probabilities for a symbol based on a bit-to-symbol mapping; calculate a conditional mean of the symbol based on the plurality of probabilities; and, generate a signal representative of the symbol based on the conditional mean of the symbol.

In yet another aspect, a computer-program product for wireless communications is provided that includes a computer-readable medium including code for selecting a plurality of probabilities for a symbol based on a bit-to-symbol mapping; calculating a conditional mean of the symbol based on the plurality of probabilities; and, generating a signal representative of the symbol based on the conditional mean of the symbol.

In yet another aspect, an access terminal is provided that includes a receiver; and a processing system coupled to the receiver to receive a symbol and configured to select a plurality of probabilities for the symbol based on a bit-to-symbol mapping; calculate a conditional mean of the symbol based on the plurality of probabilities; and, generate a signal representative of the symbol based on the conditional mean of the symbol.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects may be employed and the described aspects are intended to include all such aspects and their equivalents

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DESCRIPTION

Figure 1:
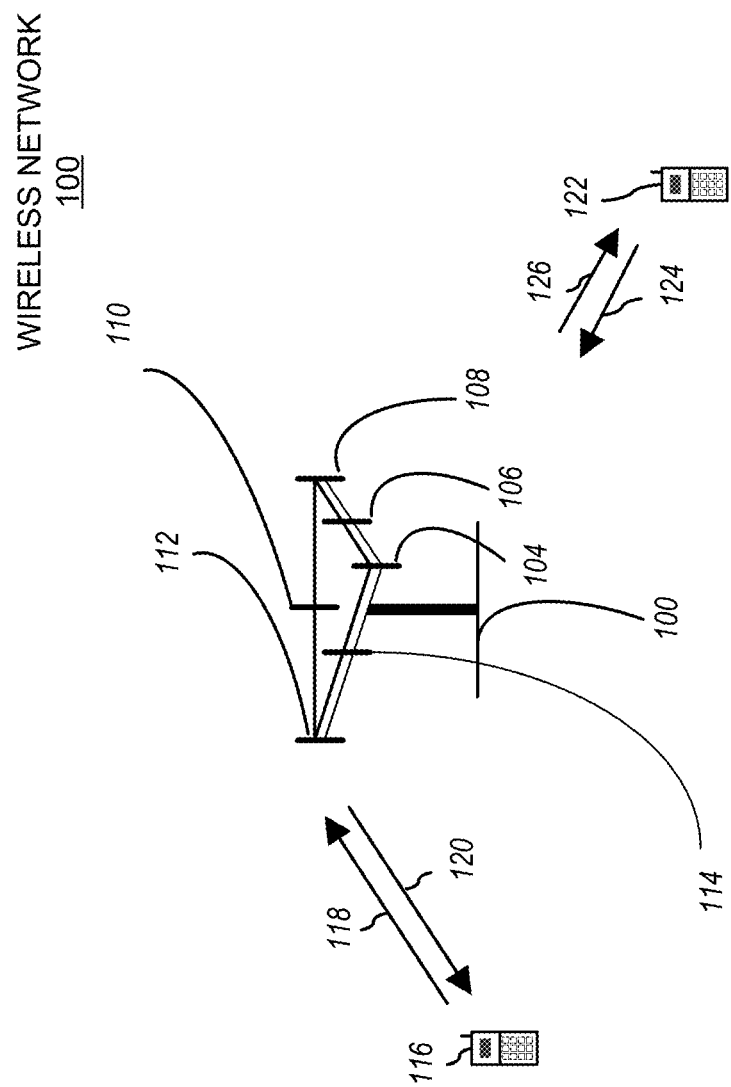
FIG. 1 is a multiple access wireless communication system configured in accordance with one aspect of the disclosure.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and other variants of CDMA such as TD-SCDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS). 3GPP Long Term Evolution (LTE) and LTE-Advanced (LTE-A) in both FDD and TDD modes are new releases of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2), which includes High Speed Packet Access (HSPA). These various radio technologies and standards are known in the art. For clarity, certain aspects of the techniques are described below for LTE, and LTE terminology is used in much of the description below.

The disclosed system is directed to a method and apparatus for parity bit LLR computation and soft-symbol probability computation for soft symbol determination, based on probabilities of possible input signals. As part of the process, iterative decoding is used. During iterative decoding, posteriori probabilities of the decoded symbols after processing (e.g., turbo decoding) must be determined In one aspect of the disclosure, the determination includes computing the a posteriori probabilities based on the output LLRs from the decoder, computing the parity bit LLR for the missing bits, and determining soft-symbol probability.

For symbol re-encoding, the probability of a symbol $p(x_i)$ is determined by multiplying by the symbol $x_i$ and summed over the set of possible transmit waveforms, also known as a constellation set. As an example, for QPSK, there are 4 possible transmit waveforms, 16-Quadrature Amplitude Modulation (QAM) has 16 possible transmit waveforms, and 64-QAM has 64 possible transmit waveforms. The complexity of this operation is linear in the number of transmit symbols. If N is the number of symbols, since the I and Q portion of the waveform are designed to be separable, the symbol probabilities can be defined fully based on bit probabilities, which have $\log_2(N)/2$ bits per dimensions I and Q. Hence, the computation space simplifies from $O(N)$ to $O(\log(N)/2)$.

In one aspect of the disclosure, the complete set of the LLRs from the decoder is calculated and passes these LLRs through a conversion circuit. The parity bit computation takes advantage of the fact that the parity bits only need to be computed on the final iteration based on the alpha and beta parameters used in the backward-forward recursions of the MAP algorithm. The system takes these LLRs and converts them to probabilities via some programmed block. One approach would be through the use of a look-up-table (LUT). The LLRs from the decoder may be linear LLRs or some scaled/companded version of the LLRs. Based on the format of the LLR, a conversion circuit is required. In one aspect of the disclosure there is a scaling of the LLR outputs that needs to be accounted for in the processing chain. Specifically, for each scaled value of the LLR there is a different LUT. The symbol probabilities are thus all possible K-tuples probabilities of the bit LLRs associated with the symbol. The bit LLRs may themselves have to go through other PHY-specific processing, for example in HSPDA there is interleaving, rate-matching, bit-collection, etc. These operations provide the complete set of LLRs for the data. As an example, for HSPDA this data would need to be rate matched and then converted to symbol probabilities.

Referring to FIG. 1, a multiple access wireless communication system according to one embodiment is illustrated. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. The access terminal 116 (AT) is in communication with the antennas 112 and 114, where the antennas 112 and 114 transmit information to the access terminal 116 over the forward link 120 and receive information from the access terminal 116 over the reverse link 118. The access terminal 122 is in communication with the antennas 106 and 108, where the antennas 106 and 108 transmit information to the access terminal 122 over the forward link 126 and receive information from the access terminal 122 over the reverse link 124.

Figure 2:
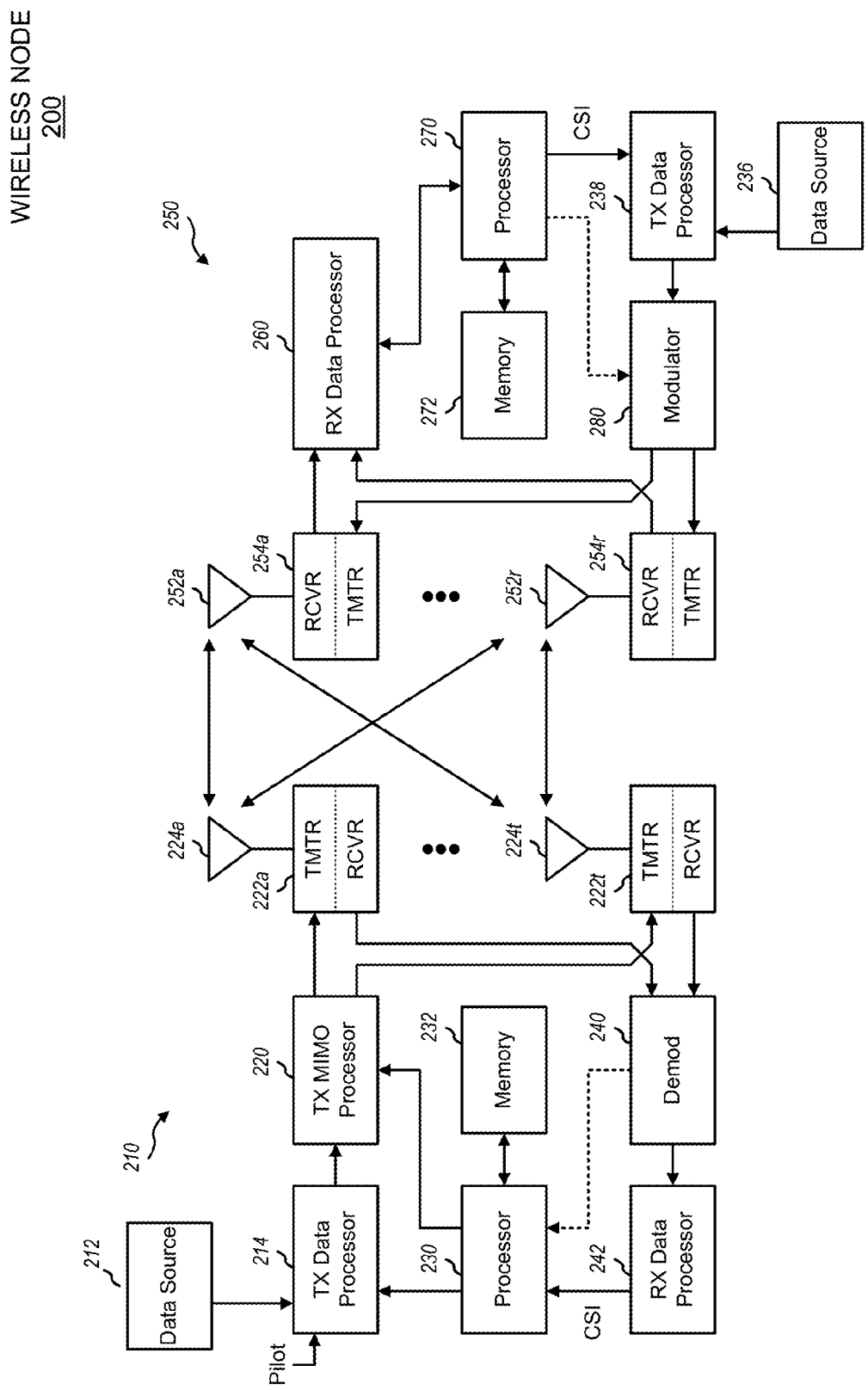
FIG. 2 is a block diagram of a communication device in the communication system of FIG. 1.

FIG. 2 is a block diagram of an embodiment of a transmitter system 210 (also known as the access point) and a receiver system 250 (also known as access terminal) in a MIMO system 200. At the transmitter system 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., QSPK, 16-QAM, or 64-QAM) selected for that data stream to provide modulation symbols. The data rate, coding, and modulation for each data stream may be determined by instructions performed by the processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
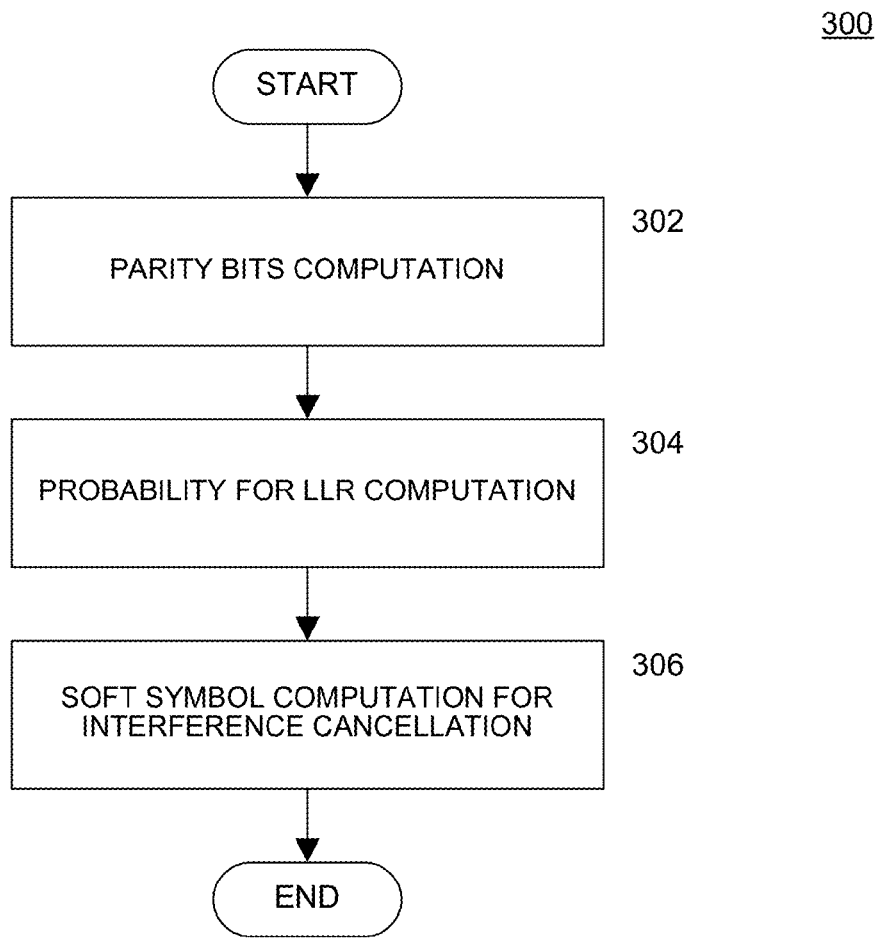
FIG. 3 is a flow diagram of the operation of the communication system.

As part of the data reception process, in one aspect of the disclosure the receiver system 250 will perform soft symbol determination and interference cancellation. The disclosed approach allows modems to suppress MIMO interference even when the CRC of interfering stream does not pass. FIG. 3 illustrates a process 300 for soft symbol determination. In step 302, LLR for parity bits are computed because the turbo decoder is designed to compute system bits for LLR. In order to generate soft symbols from the soft systematic bits, a conversion of soft systematic to soft parity bits is required. The combination of soft systematic and soft parity bits can be used to re-encode the data.

Figure 4:
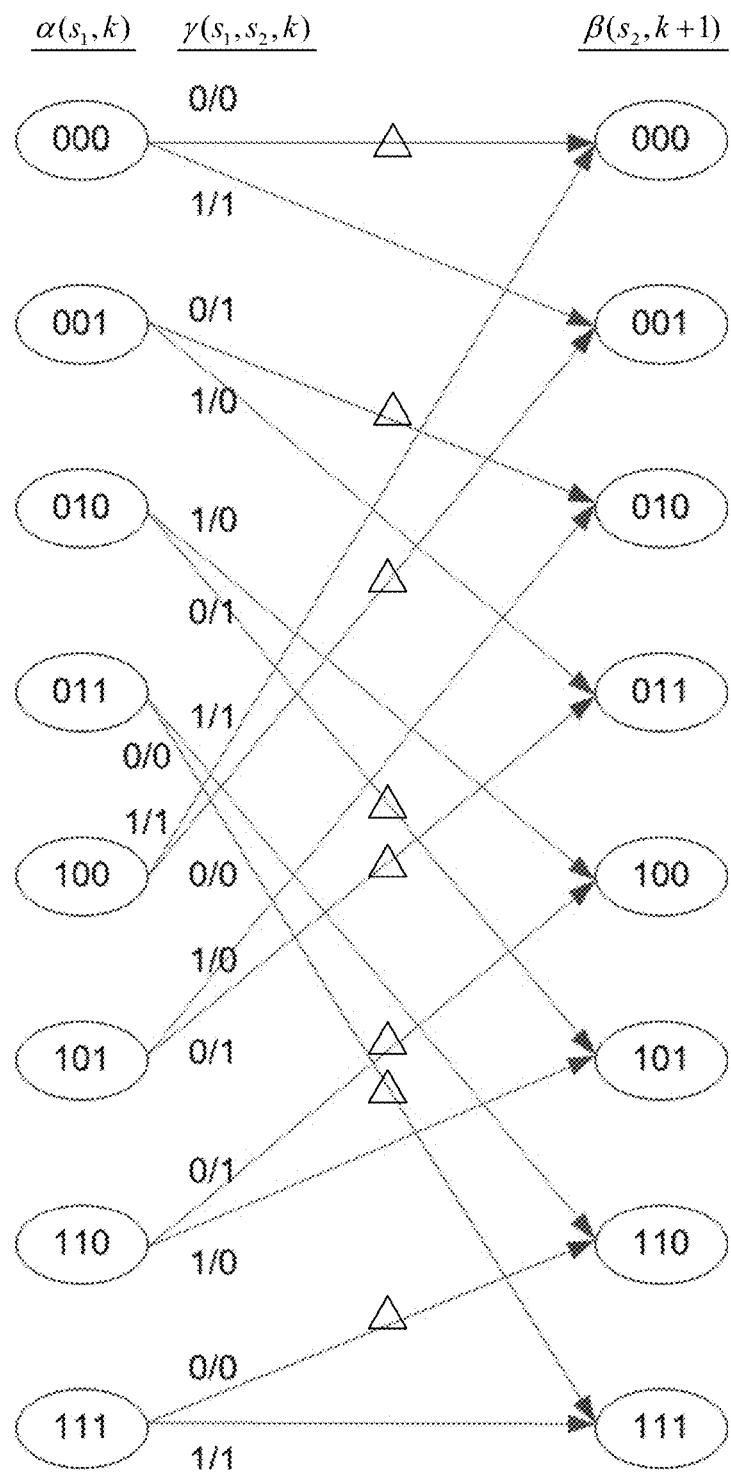
FIG. 4 is a diagram illustrating the calculation of the probability of a bit being a 1 or 0.

For WCDMA, the turbo encoder uses a constituent rate ½ code. An interleaver is applied to the systematic bits to generate another set of parity bits. The overall code rate is ⅓. In one aspect of the disclosure, generation of soft information for the systematic bits uses the MAP algorithm. The idea is to use multiply the forward state metric, $\alpha(s_1,k)$ by the branch metric $\gamma(s_1,s_2,k)$ by the reverse state $\beta(s_2,k+1)$ metric and then add all such transitions together to determine the probability. The probability that a bit is a 1 is calculated by adding $\alpha(s_1,k)*\gamma(s_1,s_2,k)*\beta(s_2,k+1)$ across all transitions identified by lines marked with triangles in FIG. 4. The details of the parity bit calculation will be disclosed herein, which includes a description of the operation of the turbo decoder as well as a discussion of the parity bit calculation. In one aspect of the disclosure, the system will be adapted for operating with QPSK, 16-QAM and 64-QAM modulation schemes. In other aspects, the system may be adapted to other modulation schemes.

During turbo decoding operations, the parity and systematic bit likelihoods are simply a function of $\alpha(s_1,k)$, $\gamma(s_1,s_2,k)$, and $\beta(s_2,k+1)$. The normal turbo decoding operation for calculating the systematic bit likelihoods carry all the information for computing the parity bit likelihoods. Thus, the turbo decoder doesn't need to calculate the parity bit LLRs separately from the systematic bit LLRs in the turbo iterations.

Figure 5:
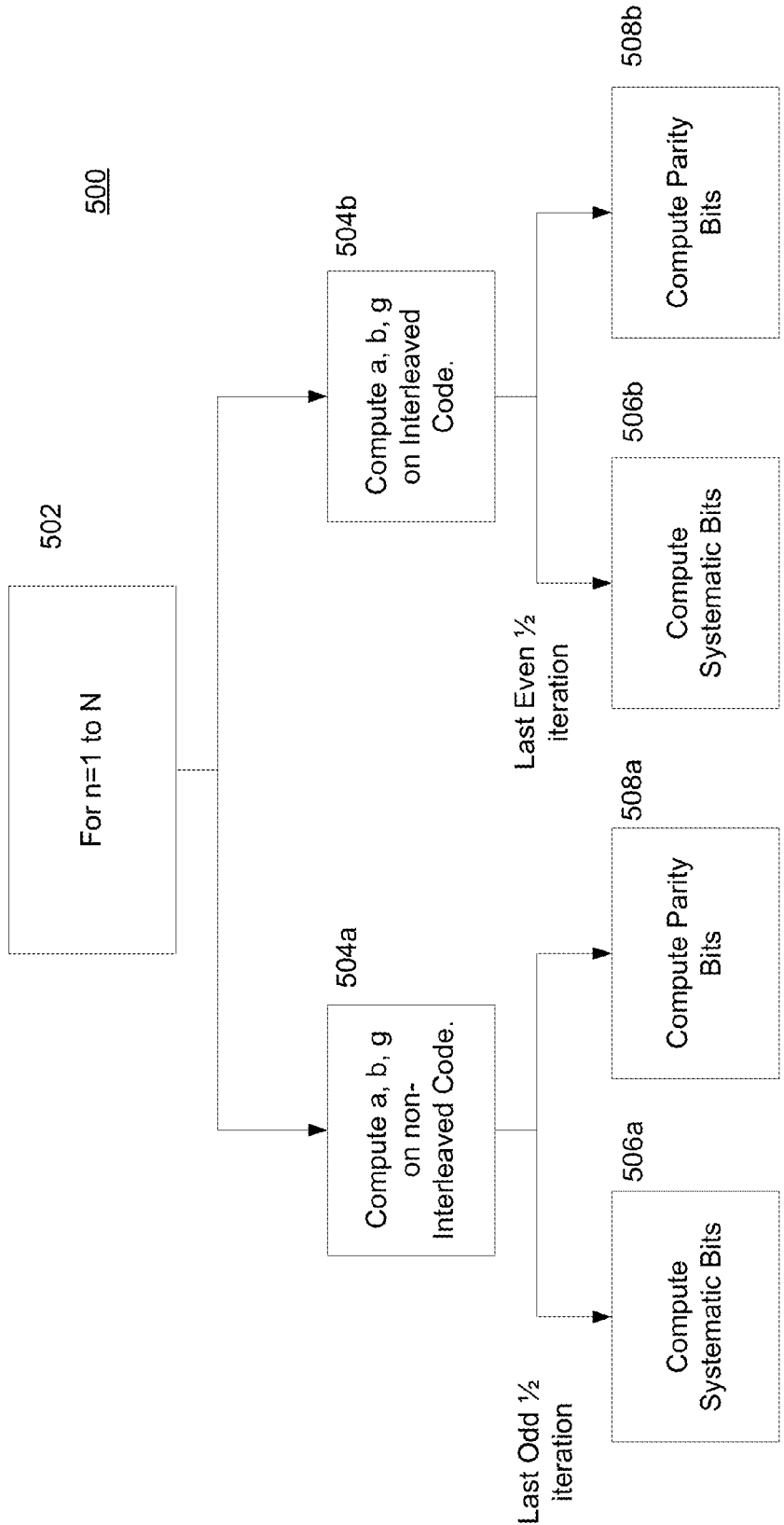
FIG. 5 is a state flow diagram of a turbo decoder with parity bit LLR extraction configured in accordance with one aspect of the disclosure.

FIG. 5 illustrates a state flow 500 of a turbo decoder with parity bit LLR extraction configured in accordance with one aspect of the disclosure. In one aspect of the disclosure, the turbo decoder operates with two single input, single output (SISO) MAP decoders. The first SISO ½ iteration is done with 1st parity bit in the ½-rate constituent code, and the second SISO ½ iteration is done with 2nd parity bit in the ½-rate constituent code.

Figure 6:
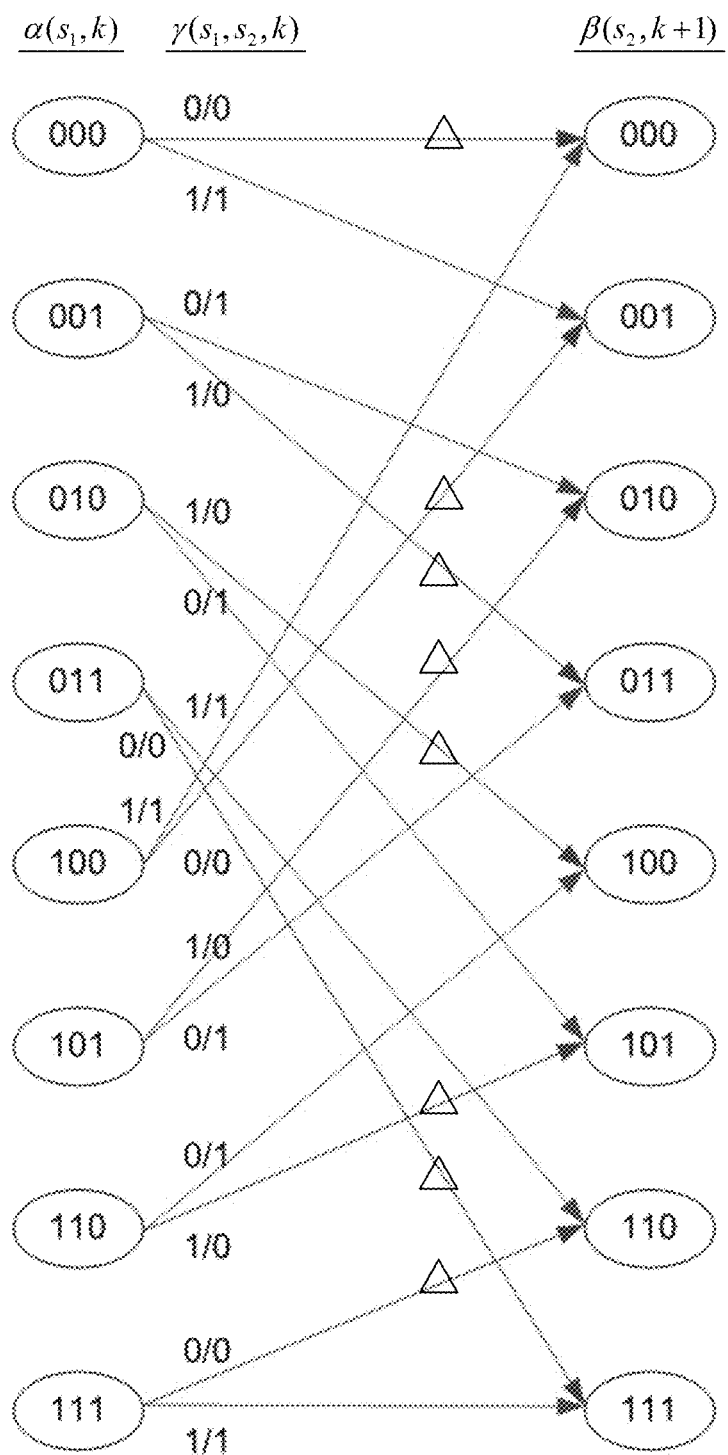
FIG. 6 is a block illustrating parity bit LLR calculation in accordance with one aspect of the disclosure.

During parity bit calculations for HSDPA, since the systematic bit calculation carries all the LLR information, the calculation of the parity bits only needs to be done only on the last two ½ iterations. Each ½ iteration corresponds to another set of parity bits. Blocks 504a-508a provide the computation of a, b, g on non-interleaved code and the computation of systematic and parity bits on the last odd ½ iteration, while blocks 504b-508b provide the computation of a, b, g on interleaved code and the computation of systematic and parity bits on the last even ½ iteration. The parity bits are measured as shown in FIG. 6 for a ½ iteration.

The timeline implications for the parity bit LLR calculation is, at worst case, equal to the time required for the systematic bit LLRs. Roughly, instead of seventeen ½ iterations for turbo decoding, the timeline assumed is 17+2=19. The timeline for including the parity bit LLR extraction is the same as extracting the LLRs for the systematic bits. Additional hardware is added to extract P0 and P1 on the last two ½ iterations.

Referring back to FIG. 3, after the LLR for parity bits are computed, then in step 304, probability for LLR is computed for soft symbol determination. In one aspect of the disclosure, rate matching is needed before bit collection. As part of the design for the iterative decoder and soft-interference cancellation schemes, the LLRs must be converted to probabilities. The precision of the table has an influence on the quantization noise in the soft-symbol remapper. This note attempts to quantify the amount of error in the probability calculation.

Figure 7:
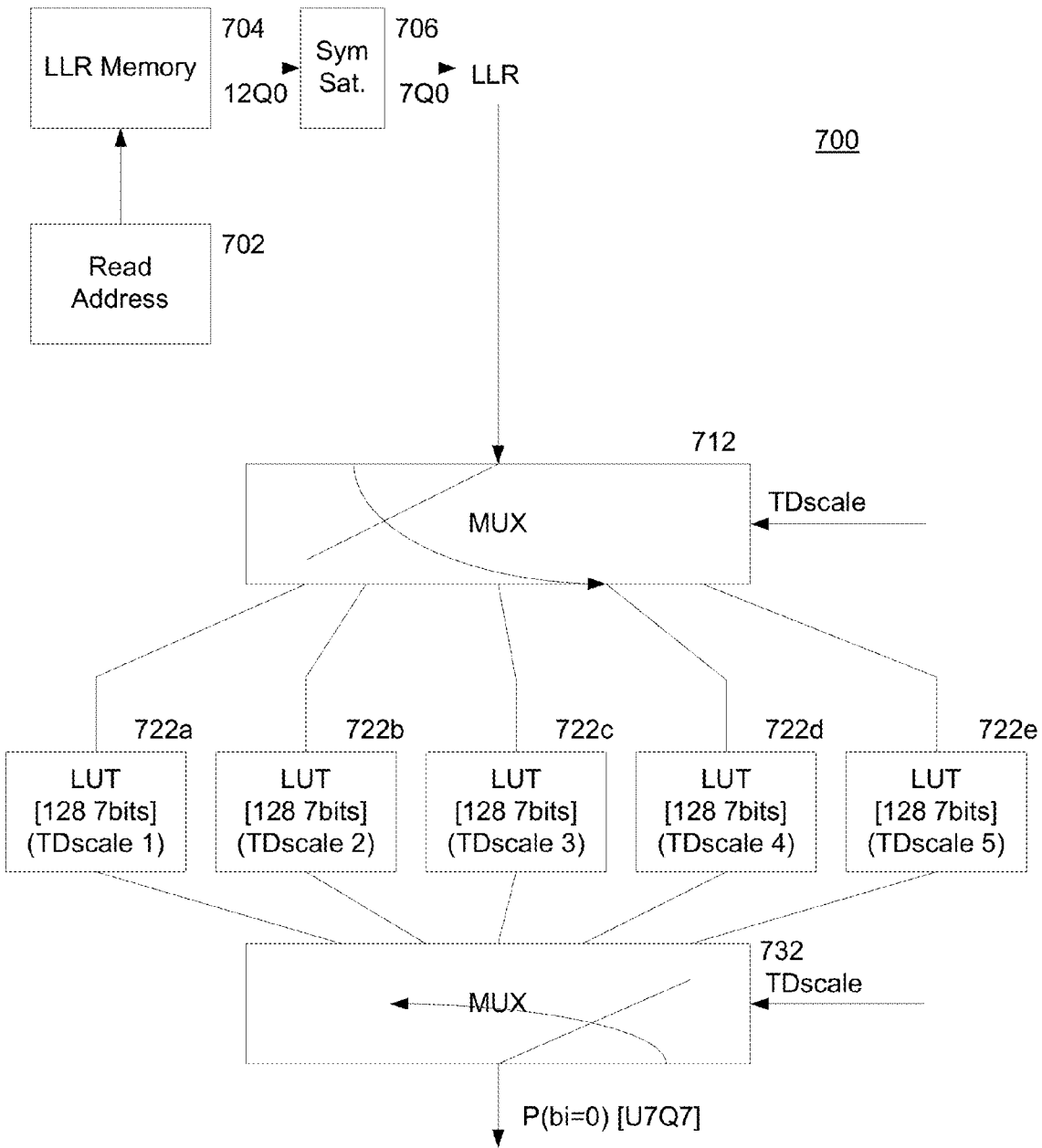
FIG. 7 is a block diagram that illustrates bit widths and look-up table design for LLR to probability mapping.

The design of the LUT, as illustrated by FIG. 7, is based on mapping the LLTs to probabilities. In one aspect of the disclosure, the probabilities are found by the following mapping:

$$p(bi = 0) = \frac{\exp(LLR)}{1 + \exp(LLR)},$$

where LLR is the $LLR_{TD}$ divided by $LLR_{scale}$. There is a LUT for each $LLR_{scale}$. In hardware, $LLR_{scale}$=TDscale/2. The fixed point LLR is 12 bits long. Each value is then truncated to 7 bits, leaving a 128 word LUT. There are 5 TDscale values being considered, hence there are 5 tables each with 128 words. This is represented as LUT($LLR_{scale}$), as illustrated by LUTs 722a-722e.

The quantization error, the equation that governs the conversion of LLRs to probability is given as follows:

$$LLR(i) = \log\frac{p(bi = 0)}{p(bi = 1)}.$$

Hence, $p(bi = 0) = \frac{\exp(LLR)}{1 + \exp(LLR)}$.

After quantization, there is an error of $\Delta$ in the LLR, so the probability estimated is:

$$\hat{p}(bi = 0) = \frac{\exp(LLR + \Delta)}{1 + \exp(LLR + \Delta)}.$$

The worst case error is when LLR is close to 0, so the error term is:

$$\hat{p}(bi = 0) - p(bi = 0)$$
$$= \frac{\exp(\Delta)}{1 + \exp(\Delta)} - \frac{\exp(0)}{1 + \exp(0)}$$
$$= \frac{\exp(\Delta)}{1 + \exp(\Delta)} - \frac{1}{2}$$
$$\approx \frac{1 + \Delta}{1 + 1 + \Delta} - \frac{1}{2}$$
$$= \frac{2(1 + \Delta) - 2 + \Delta}{(2 + \Delta)(2)}$$
$$\approx \frac{\Delta}{(4 + 2\Delta)}$$
$$\approx \frac{\Delta}{(4)}.$$

The average error is given by:

$$MSE(prob) = \frac{1}{x}\int_0^x \left(\frac{\Delta}{(4)}\right)^2 d\Delta$$
$$= \frac{1}{x}\frac{x^3}{48}$$
$$= \frac{x^2}{48}.$$

In one aspect of the disclosure, to determine the MSE, the TDscale value is used. The possible error values are [−1/TDscale, 1/TDscale]. If a uniform distribution of errors is assumed, then x=1/TDscale.

TABLE 1

| MSE in probability versus TDscale | |
| --- | --- |
| TDscale | MSE(Probability) |
| 3 | −26 dBc |
| 6 | −32 dBc |
| 8 | −34 dBc |
| 9 | −36 dBc |
| 12 | −38 dBc |

If another bit of resolution is added, as illustrated by TDscale 3 and TDscale 6, the MSE will reduce by 6 dB. In one aspect of the disclosure, for the probability MSE to be less than −38 dBc, 9 bits of resolution should be used.

The LLR is a 12 bit word. If only a 7 bit word is used, the maximum LLR value is 63/12=5.25. The maximum error in probability in dBc is:

$$20*\log10(Err(p(bi = 0)))$$
$$= 20*\log10\left(1 - \frac{\exp(5.25)}{1 + \exp(5.25)}\right)$$
$$= 20*\log10(1 - .9948)$$
$$= -45 \text{ dBc}.$$

Again referring back to FIG. 3, then in step 306, soft symbol computation for interference cancellation is performed. As part of the iterative decoding, soft symbols need to be reencoded for interference cancellation. In one aspect of the disclosure, soft symbol generation may be described as finding the probability of each possible constellation point $\{X_i\} \leftrightarrow \{p_{X_i}\}$. The soft symbol is given as $$X_{soft} = \sum_i p_{X_i} X_i,$$

which is the conditional mean of the symbol given the probabilities.

The probabilities can be calculated directly from the probabilities of each bit in the constellation. For 16-QAM the 4-tuple of probabilities $\{p_0, p_1, p_2, p_3\}$, where $p_i$ is the probability of the $i^{th}$ bit equaling 0, the probability of each symbol may be calculated by multiplying the probabilities and treating the probabilities as independent.

Figure 8:
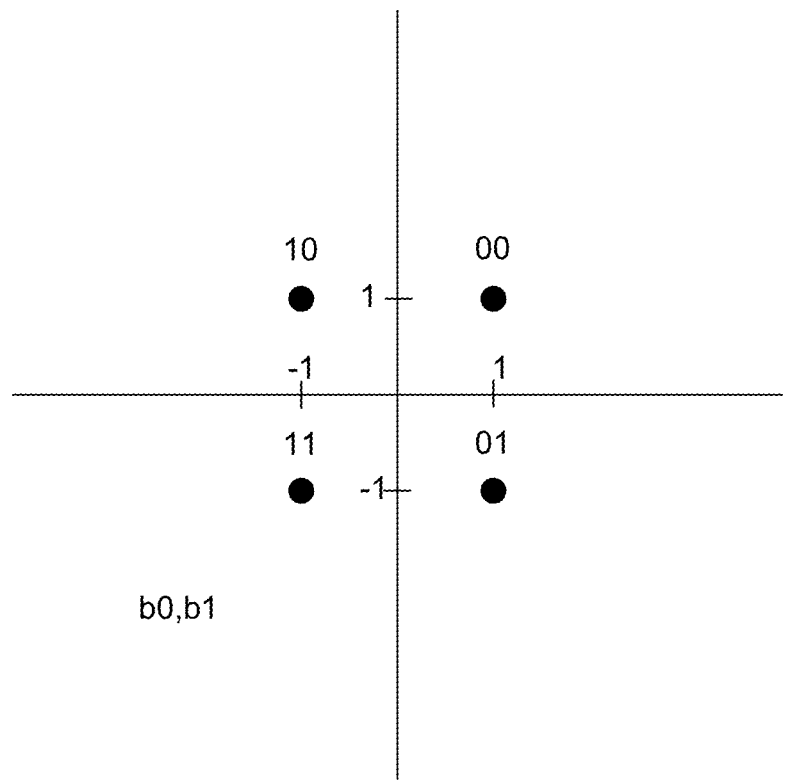
FIG. 8 is a QPSK constellation mapping.
Figure 9:
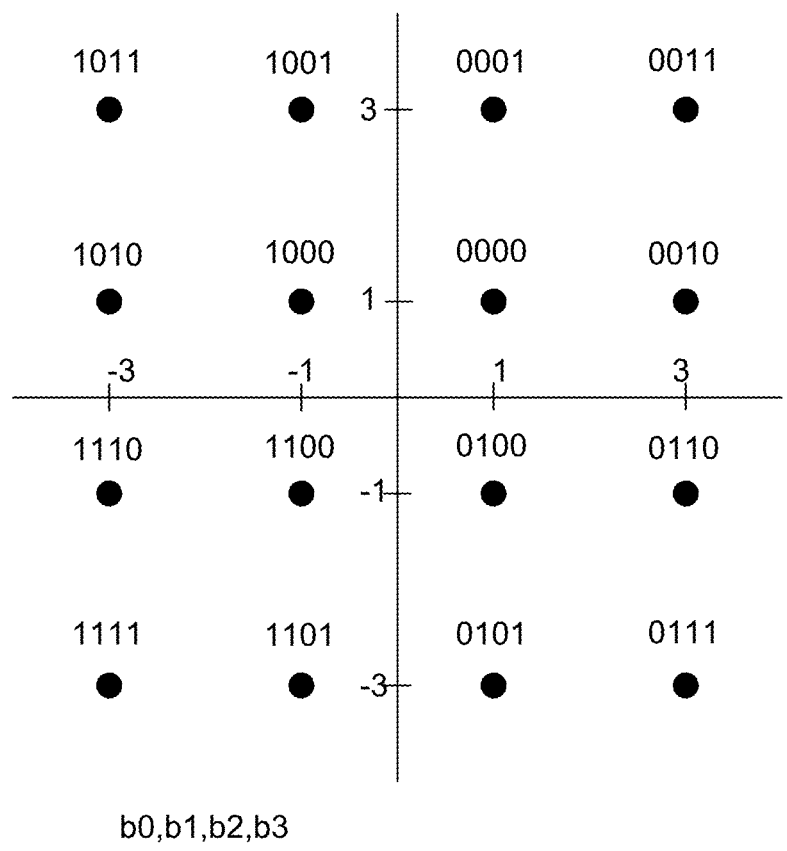
FIG. 9 is a 16-QAM constellation mapping.
Figure 10:
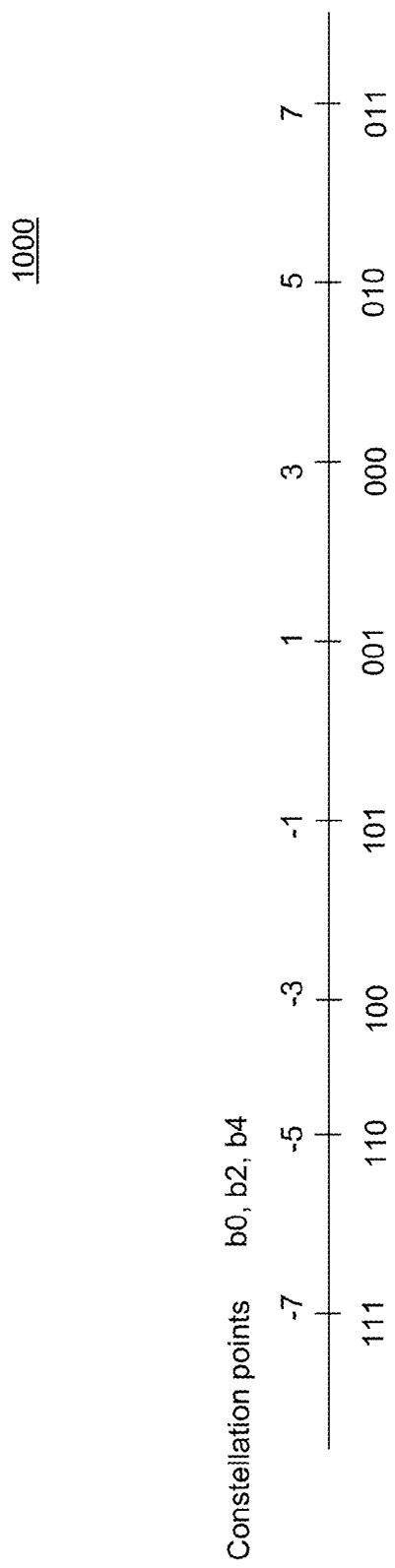
FIG. 10 is a constellation mapping for in-phase component of a 64-QAM constellation.

As part of the simplifications for the soft-symbol re-encoding, the constellation mappings are described herein for QPSK, 16-QAM and 64-QAM, where FIG. 8 illustrates the format of the input bits forming the constellation for QPSK, which is $\{b0, b1\}$ with probabilities $\{p0, p1\}$; FIG. 9 illustrates the format of the input bits forming the constellation for 16 QAM, which is $\{b_0, b_1, b_2, b_3\}$ with probabilities $\{p_0, p_1, p_2, p_3\}$; and FIG. 10 illustrates the format of the input bits forming the constellation 64 QAM, which is $\{b_0, b_1, b_2, b_3, b_4, b_5\}$ with probabilities $\{p_0, p_1, p_2, p_3, p_4, p_5\}$.

In one aspect of the disclosure, it is possible to measure the soft symbols without resorting to calculating the probability of each constellation point. The soft symbol can be calculated for each modulation. For the in-phase component of QPSK:

$$\hat{X}_I = E(X_I|p_0)$$
$$= p_0 + (-1)*(1-p_0)$$
$$= 2p_0 - 1$$
$$= \gamma(p_0).$$

For the quadrature component of QPSK:

$$\hat{X}_Q = E(X_Q|p_1)$$
$$= p_1 + (-1)*(1-p_1)$$
$$= 2p_1 - 1$$
$$= \gamma(p_1).$$

For the in-phase component of 16 QAM:

$$\hat{X}_I = E(X_I|p_0, p_2)$$
$$= p_0 p_2 + 3 p_0 (1 - p_2) + (-3)(1 - p_0)(1 - p_2) + (-1)(1 - p_0)(p_2)$$
$$= 6 p_0 + 2 p_2 - 4 p_0 p_2 - 3$$
$$= F(p_0, p_2, 3).$$

For the quadrature component of 16 QAM:

$$\hat{X}_Q = E(X_Q|p_1, p_3)$$
$$= p_1 p_2 + 3 p_1 (1 - p_3) + (-3)(1 - p_1)(1 - p_3) + (-1)(1 - p_1)(p_3)$$
$$= 6 p_1 + 2 p_3 - 4 p_1 p_3 - 3$$
$$= F(p_1, p_3, 3).$$

For the in-phase component of 64 QAM:

$$\hat{X}_I = E(X_I|p_o, p_2, p_4)$$
$$= 3 p_0 p_2 p_4 + 1 * p_0 p_2 (1 - p_4) + 5 p_0 (1 - p_2)(p_4) + 7 p_0 (1 - p_2)(1 - p_4) - 3(1 - p_0) p_2 p_4 - 1 * (1 - p_0) p_2 (1 - p_4) - 5(1 - p_0)(1 - p_2)(p_4) - 7(1 - p_0)(1 - p_2)(1 - p_4)$$

$$= (2 p_0 - 1) * (4 p_2 p_4 - 6 p_2 - 2 p_4 + 7)$$
$$= \gamma(p_0) * (-F(p_2, p_4, 7)).$$

For the quadrature component 64 QAM:

$$\hat{X}_Q = E(X_I|p_1, p_3, p_5)$$
$$= (2 p_1 - 1) * (4 p_3 p_5 - 6 p_3 - 2 p_5 + 7)$$
$$= \gamma(p_1) * (-F(p_3, p_5, 7)).$$

It is possible to measure the soft symbols without resorting to calculating the probability of each constellation point. The soft symbol can be calculated for each modulation. Residual error computation is necessary as part of the soft symbol determination. The residual symbol error, also referred to as the residual mean, is computed by the following:

$$E(X_I^2|\underline{p}) - E(X_I|\underline{p})^2 + E(X_Q^2|\underline{p}) - E(X_Q|\underline{p})^2,$$

where $\underline{p}$ is the vector of probabilities, where, for QPSK:

$$E(\hat{X}_I^2|\underline{p}) = E(\hat{X}_Q^2|\underline{p}) = 1;$$

for 16 QAM:

$$E(\hat{X}_I^2|\underline{p}) = 9 * [p_0 * (1 - p_2) + (1 - p_0) * (1 - p_2)] + 1 [p_0 * p_2 + (1 - p_0) * p_2]$$
$$= 9 - 8 p_2; \text{ and}$$
$$E(\hat{X}_Q^2|\underline{p}) = 9 - 8 p_3;$$

for 64 QAM:

$$E(\hat{X}_I^2) = 1 * p_2 p_4 + 9 * p_2 (1 - p_4) + 25 * (1 - p_2) p_4 + 49 * (1 - p_2)(1 - p_4)$$
$$= 16 * p_2 p_4 - 40 * p_2 - 24 * p_4 + 49; \text{ and}$$
$$E(\hat{X}_Q^2) = 16 * p_3 p_5 - 40 * p_3 - 24 * p_5 + 49.$$

The disclosure includes hardware implementation of various soft metrics developed above. These floating point equations are converted to fixed point implementation as described in the following section.

Figure 11:
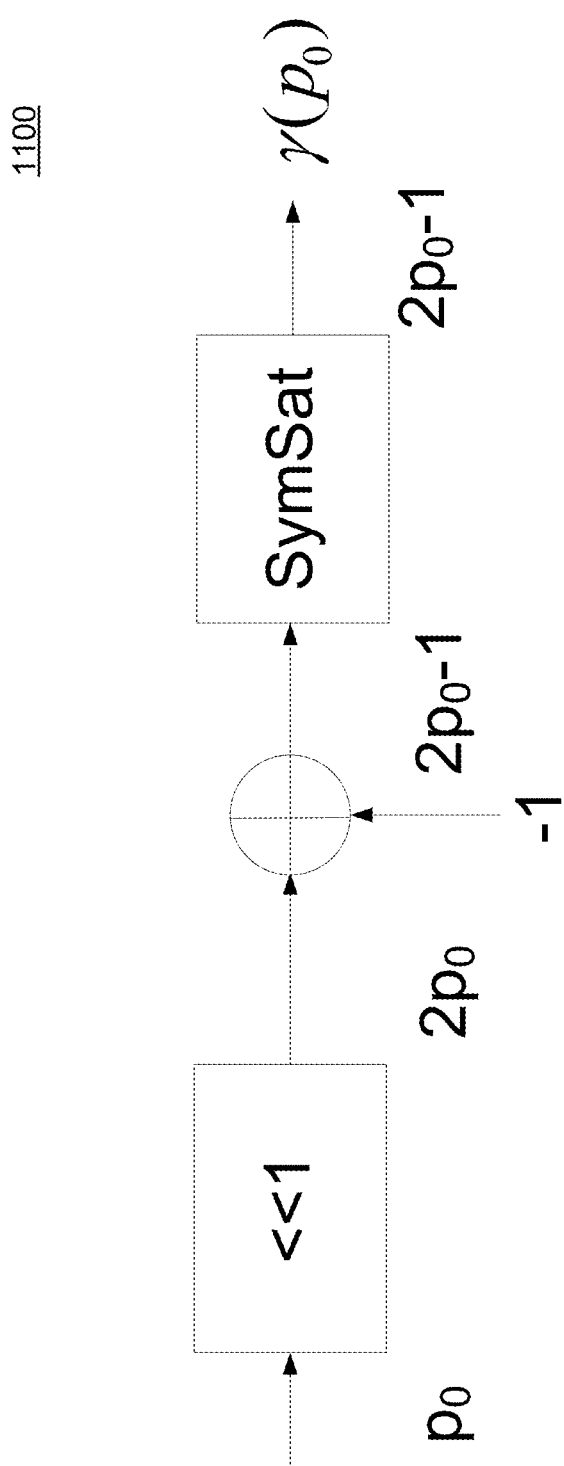
FIG. 11 is a block diagram of a reencoder for in-phase signal QPSK modulation.

For QPSK modulation, FIG. 11 depicts a reencoder for in-phase signal QPSK modulation circuit 1100 to calculate the in-phase soft symbol. For simplicity of design, the output is made into a format which is the same with 16-QAM AND 64-QAM. The reencoder for the quadrature component is $\gamma(p_1)$.

Figure 12:
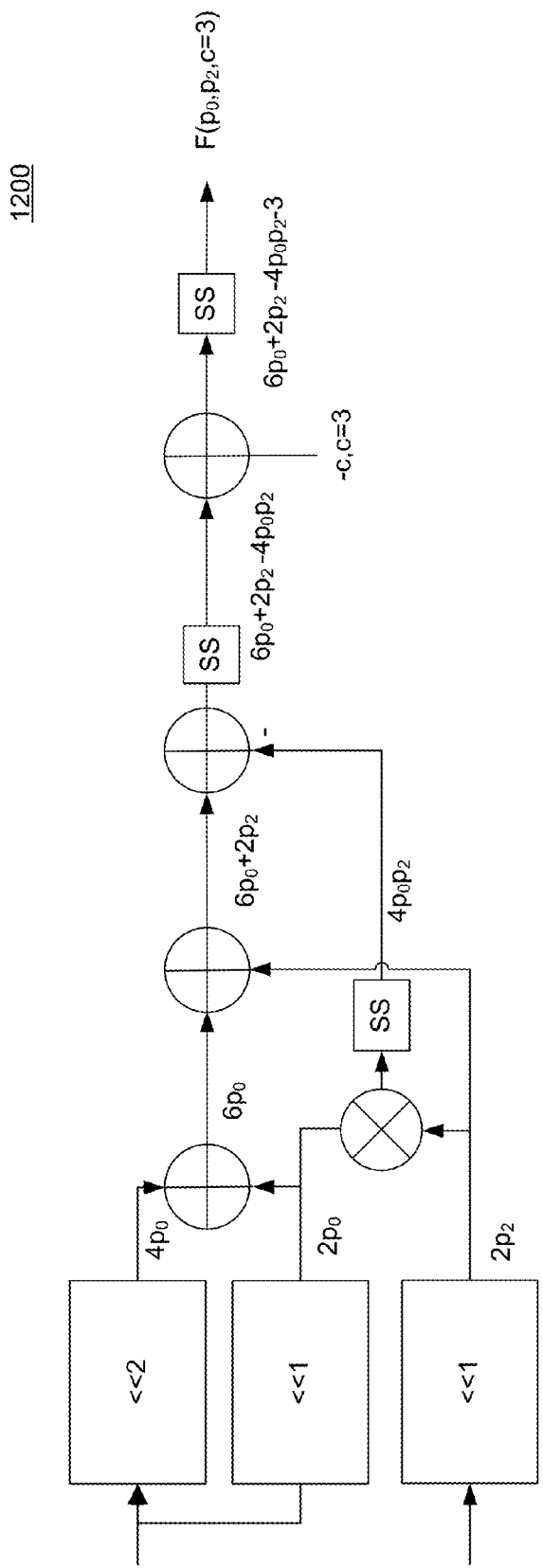
FIG. 12 is a block diagram of a reencoder for in-phase signal 16-QAM modulation.

For 16-QAM modulation, FIG. 12 depicts a reencoder for in-phase signal 16-QAM modulation circuit 1200 used to calculate soft symbols on the in-phase component. The reencoder for the quadrature component is:

$$F(p_1, p_3, 3).$$

Recall that:

$$E(X_{I,\ 64\ QAM}) = \gamma(p_0) * (-F(p_2, p_4, 7)).$$

Figure 13:
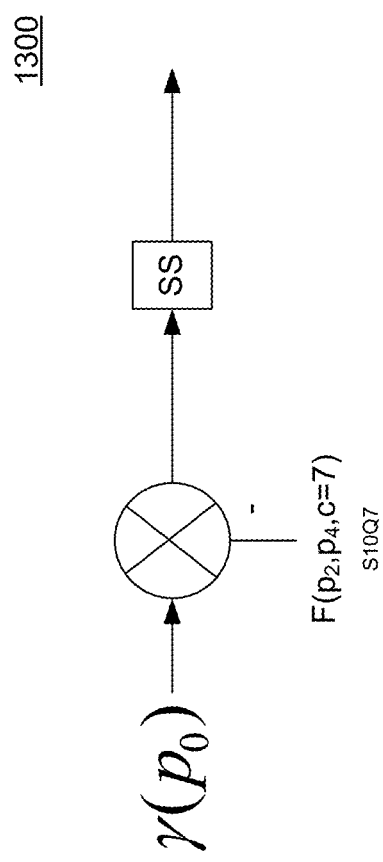
FIG. 13 is a block diagram of a reencoder for in-phase signal 64-QAM modulation.

Thus, both the hardware blocks from 16-QAM and QPSK, as shown in FIG. 11 and FIG. 12, may be used to determine the 64-QAM results. The outputs of these blocks can be multiplied and saturated to generate the soft symbol. FIG. 13 depicts a reencoder for in-phase signal 64-QAM modulation circuit 1300. The reencoder for the quadrature component is:

$$E(X_{Q,\ 64\ QAM}) = \gamma(p_1) * (-F(p_3, p_5, 7)).$$

Figure 14:
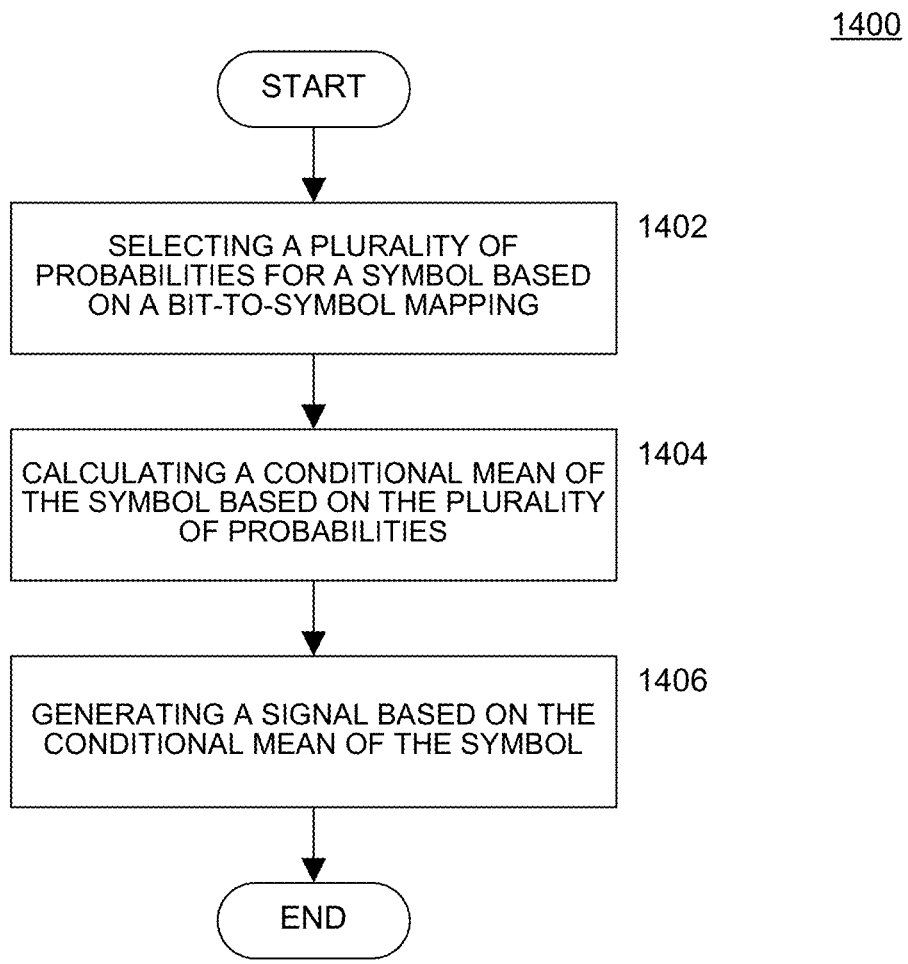
FIG. 14 is a second flow diagram of the operation of the communication system.

FIG. 14 illustrates a process 1400 configured in accordance with one aspect of the disclosure for determining a symbol. The process 1400 includes a step 1402 where a plurality of probabilities is selected for a symbol based on a bit-to-symbol mapping. Then, in step 1404, a conditional mean of the symbol is calculated based on the plurality of probabilities. After the conditional mean has been determined, then in step 1406 a signal is generated based on the conditional mean of the symbol.

Figure 15:
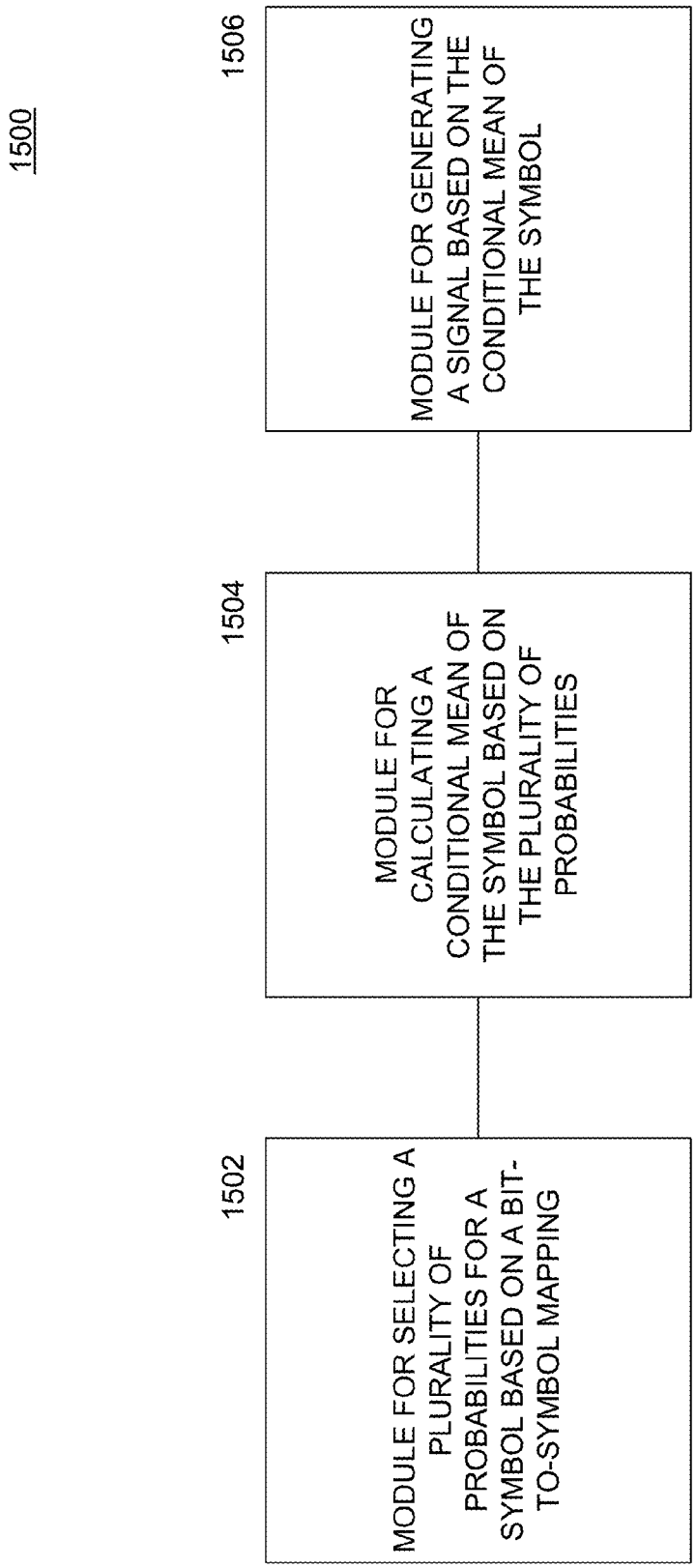
FIG. 15 is a block diagram illustrating the functionality of an apparatus for soft symbol determination in accordance with one aspect of the disclosure.

FIG. 15 is a diagram illustrating the functionality of an apparatus 1500 in accordance with one aspect of the disclosure. The apparatus 1500 includes a module 1502 for selecting a plurality of probabilities for a symbol based on a bit-to-symbol mapping; a module 1504 for calculating a conditional mean of the symbol based on the plurality of probabilities; and a module 1506 for generating a signal based on the conditional mean of the symbol.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method of wireless communication, comprising:
    selecting one or more probabilities for a symbol based on at least one soft bit; and
    generating a signal representative of the symbol based on the one or more probabilities for the symbol.

2. The method of claim 1, further comprising:
    receiving a second symbol; and
    canceling interference from the received second symbol based on the generated signal.

3. The method of claim 1, further comprising calculating a metric of the symbol based on the one or more probabilities, wherein the signal is generated based on the metric.

4. The method of claim 3, wherein the metric is a conditional mean.

5. The method of claim 1, further comprising determining a residual symbol error based on the one or more probabilities.

6. The method of claim 1, further comprising determining a plurality of parity bits for interference cancellation based on the one or more probabilities.

7. The method of claim 1, further comprising determining probabilities of a plurality of parity bits.

8. The method of claim 1, wherein the selecting the one or more probabilities comprises:
    matching a rate of coding of the at least one soft bit;
    interleaving the at least one soft bit;
    performing bit collection to create a sequence for bit-to-symbol mapping; and
    selecting a predetermined number of bits based a constellation size,
    wherein the one or more probabilities is based on the selected bits.

9. The method of claim 8, wherein the rate matching comprises converting from a turbo coding rate to an actual code rate.

10. An apparatus for wireless communication, comprising:
means for selecting one or more probabilities for a symbol based on at least one soft bit; and
means for generating a signal representative of the symbol based on the one or more probabilities for the symbol.

11. The apparatus of claim 10, further comprising:
means for receiving a second symbol; and
means for canceling interference from the received second symbol based on the generated signal.

12. The apparatus of claim 10, further comprising means for calculating a metric of the symbol based on the one or more probabilities, wherein the signal is generated based on the metric.

13. The apparatus of claim 12, wherein the metric is a conditional mean.

14. The apparatus of claim 10, further comprising means for determining a residual symbol error based on the one or more probabilities.

15. The apparatus of claim 10, further comprising means for determining a plurality of parity bits for interference cancellation based on the one or more probabilities.

16. The apparatus of claim 10, further comprising means for determining probabilities of a plurality of parity bits.

17. The apparatus of claim 10, wherein the means for selecting the one or more probabilities is configured to:
match a rate of coding of the at least one soft bit;
interleave the at least one soft bit;
perform bit collection to create a sequence for bit-to-symbol mapping; and
select a predetermined number of bits based a constellation size,
wherein the one or more probabilities is based on the selected bits.

18. The apparatus of claim 17, wherein to rate match, the means for selecting is configured to convert from a turbo coding rate to an actual code rate.

19. An apparatus for wireless communication, comprising:
a processing system configured to:
select one or more probabilities for a symbol based on at least one soft bit; and
generate a signal representative of the symbol based on the one or more probabilities for the symbol.

20. The apparatus of claim 19, wherein the processing system is further configured to:
receive a second symbol; and
cancel interference from the received second symbol based on the generated signal.

21. The apparatus of claim 19, wherein the processing system is further configured to calculate a metric of the symbol based on the one or more probabilities, wherein the signal is generated based on the metric.

22. The apparatus of claim 21, wherein the metric is a conditional mean.

23. The apparatus of claim 19, wherein the processing system is further configured to determine a residual symbol error based on the one or more probabilities.

24. The apparatus of claim 19, wherein the processing system is further configured to determine a plurality of parity bits for interference cancellation based on the one or more probabilities.

25. The apparatus of claim 19, wherein the processing system is further configured to determine probabilities of a plurality of parity bits.

26. The apparatus of claim 19, wherein the processing system selects the one or more probabilities by:
matching a rate of coding of the at least one soft bit;
interleaving the at least one soft bit;
performing bit collection to create a sequence for bit-to-symbol mapping; and
selecting a predetermined number of bits based a constellation size.

27. The apparatus of claim 26, wherein the processing system rate matches by converting from a turbo coding rate to an actual code rate.

28. A computer program product, comprising:
a computer-readable medium comprising code for:
selecting one or more probabilities for a symbol based on at least one soft bit; and
generating a signal representative of the symbol based on the one or more probabilities for the symbol.

29. The computer program product of claim 28, wherein the computer-readable medium further comprises code for:
receiving a second symbol; and
canceling interference from the received second symbol based on the generated signal.

30. The computer program product of claim 28, wherein the computer-readable medium further comprises code for calculating a metric of the symbol based on the one or more probabilities, wherein the signal is generated based on the metric.

31. The computer program product of claim 30, wherein the metric is a conditional mean.

32. The computer program product of claim 28, wherein the computer-readable medium further comprises code for determining a residual symbol error based on the one or more probabilities.

33. The computer program product of claim 28, wherein the computer-readable medium further comprises code for determining a plurality of parity bits for interference cancellation based on the one or more probabilities.

34. The computer program product of claim 28, wherein the computer-readable medium further comprises code for determining probabilities of a plurality of parity bits.

35. The computer program product of claim 28, wherein the code for selecting the one or more probabilities comprises code for:
matching a rate of coding of the at least one soft bit;
interleaving the at least one soft bit;
performing bit collection to create a sequence for bit-to-symbol mapping; and
selecting a predetermined number of bits based a constellation size.

36. The computer program product of claim 35, wherein the code for rate matching converts from a turbo coding rate to an actual code rate.

* * * * *